(12) United States Patent
Allen et al.

(10) Patent No.: US 9,185,081 B2
(45) Date of Patent: Nov. 10, 2015

(54) FORMAT FRIENDLY ENCRYPTION

(71) Applicant: Symantec Corporation, Mountain View, CA (US)

(72) Inventors: Michael Allen, Mountain View, CA (US); Yuancong Zhao, Fremont, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 13/657,670

(22) Filed: Oct. 22, 2012

(65) Prior Publication Data

US 2014/0115328 A1    Apr. 24, 2014

(51) Int. Cl.
| | |
|---|---|
| *G06F 12/14* | (2006.01) |
| *H04L 29/06* | (2006.01) |
| *G06F 21/62* | (2013.01) |
| *G06F 17/21* | (2006.01) |

(52) U.S. Cl.
CPC ........ *H04L 63/0428* (2013.01); *G06F 21/6227* (2013.01); *H04L 29/06* (2013.01); *G06F 17/211* (2013.01); *G06F 2221/2107* (2013.01)

(58) Field of Classification Search
CPC ..... G06F 21/00; G06F 21/62; G06F 21/6209; G06F 17/30; G06F 21/6227; G06F 17/211; G06F 2221/2107; H04L 9/00; H04L 63/0428; H04L 29/06; H04N 1/00127; H04N 1/32144
See application file for complete search history.

(56) References Cited

U.S. PATENT DOCUMENTS

| | | | |
|---|---|---|---|
| 7,480,382 B2 * | 1/2009 | Dunbar et al. ................ 380/217 |
| 7,561,287 B1 * | 7/2009 | Antonacci et al. ........... 358/1.15 |
| 7,568,101 B1 * | 7/2009 | Catorcini et al. ............. 713/176 |
| 8,145,718 B1 * | 3/2012 | Kacker et al. ................. 709/206 |
| 8,407,244 B2 * | 3/2013 | Canessa et al. ............... 707/769 |
| 2002/0184485 A1 * | 12/2002 | Dray et al. .................... 713/150 |
| 2003/0035585 A1 * | 2/2003 | Osborne et al. .............. 382/232 |
| 2004/0205205 A1 * | 10/2004 | Patterson ...................... 709/229 |
| 2006/0184422 A1 * | 8/2006 | Cooper et al. ................. 705/16 |
| 2006/0256380 A1 * | 11/2006 | Klassen et al. ............... 358/1.16 |
| 2007/0061737 A1 * | 3/2007 | Jaeger .......................... 715/746 |

(Continued)

OTHER PUBLICATIONS

"Java: encrypt text into an image", Jun. 16, 2009: http://forum.codecall.net/topic/48613-java-encrypt-text-into-an-image/.

(Continued)

*Primary Examiner* — Taghi Arani
*Assistant Examiner* — Sharon Lynch
(74) *Attorney, Agent, or Firm* — Patterson & Sheridan, LLP

(57) ABSTRACT

Techniques are disclosed for encrypting application data files using a format-friendly encryption process. A software agent may create an encrypted version of an application file using the same data file format of the unencrypted file. For example, when a user encrypts a word processing document, the software agent outputs a word processing document which includes an encrypted copy of the first word processing document. Application data files for other file formats may be encrypted in a similar manner. Further, format-friendly encrypted documents may include instructions for accessing the encrypted content, allowing the standard applications for accessing a given file format to present the instructions to a user. Creating encrypted document using the format-friendly encryption formats allows users who access an encrypted file hosted by a cloud storage provider to receive the information needed to access that application file.

21 Claims, 7 Drawing Sheets

(56) References Cited

U.S. PATENT DOCUMENTS

| | | | |
|---|---|---|---|
| 2007/0299633 A1* | 12/2007 | Ohsaka | 702/188 |
| 2008/0040359 A1* | 2/2008 | Arrouye et al. | 707/100 |
| 2008/0215881 A1* | 9/2008 | Cai et al. | 713/165 |
| 2008/0235669 A1* | 9/2008 | Carro | 717/136 |
| 2008/0288597 A1* | 11/2008 | Christensen et al. | 709/206 |
| 2008/0300850 A1* | 12/2008 | Chen et al. | 703/22 |
| 2009/0043784 A1* | 2/2009 | Carro | 707/10 |
| 2010/0095127 A1* | 4/2010 | Banerjee et al. | 713/179 |
| 2010/0115263 A1* | 5/2010 | Patterson | 713/150 |
| 2010/0235636 A1* | 9/2010 | Cohen | 713/168 |
| 2010/0299536 A1* | 11/2010 | Martin et al. | 713/189 |
| 2011/0030058 A1* | 2/2011 | Ben-Itzhak et al. | 726/24 |
| 2012/0030213 A1* | 2/2012 | Arrouye et al. | 707/741 |
| 2012/0151553 A1* | 6/2012 | Burgess et al. | 726/1 |
| 2012/0166496 A1* | 6/2012 | Lacey et al. | 707/805 |
| 2013/0018927 A1* | 1/2013 | Chang | 707/805 |
| 2013/0080792 A1* | 3/2013 | Cai et al. | 713/193 |
| 2013/0117008 A1* | 5/2013 | Condie et al. | 704/2 |
| 2014/0289530 A1* | 9/2014 | De Waal et al. | 713/171 |

OTHER PUBLICATIONS

Wikipedia: "Steganography", Oct. 21, 2012: http://en.wikipedia.org/w/index.php?title=Steganography&oldid=519103643.

Wikipedia: "Format-preserving encryption", May 29, 2012: http://en.wikipedia.org/w/index.php?title=Format-preserving_encryption&oldid=495032040.

Securosis blog: "Format and Datatype Preserving Encryption", https://securosis.com/blog/format-and-datatype-preserving-encryption/, Sep. 10, 2009.

* cited by examiner

FORMAT FRIENDLY ENCRYPTION

BACKGROUND

1. Field

Embodiments of the invention generally relate to techniques for managing encrypted files. More specifically, embodiments of the invention provide format-friendly encryption techniques where the format of a file being encrypted is selected as a format for an encrypted copy of that file.

2. Description of the Related Art

Protecting access to data is a well known issue in numerous contexts. For example, it is common for individuals to encrypt sensitive data using a variety of software encryption tools. Frequently, these tools are used to encrypt a file, e.g., a word-processor document, using a symmetric key generated form a password. So long as the user remembers the password, they can decrypt the document.

Similarly, it is common for an enterprise to encrypt sensitive data created by users and a variety of tools are available for this purpose. For example, in an enterprise setting, documents (and other files) are encrypted using keys associated with users authorized to access a given document (or file). In such a case, e.g., an administrator may specify that all documents in a given folder (or other shared storage location) should be encrypted. An administrator may also specify which users are authorized to access a given document (or folder) and create/distribute keys used to do so. In some cases, the encryption/decryption may generally be transparent to users within the enterprise. For example, a proxy, plug-in, driver, or software agent, may be used to encrypt and decrypt files accessed by a given application (e.g., a word processor, spreadsheet, email client, presentation software, etc.). Typically, encrypted files are stored using a format that is independent from that of the format of the unencrypted file. For example, a spreadsheet file, word processor document, etc., may be converted to a proprietary binary format (or simple text format) when encrypted using a software tool. In such a case, when accessed by an application that can read the original data format, the encrypted content is unintelligible.

More and more data is being shared outside of enterprise boundaries, e.g., a variety of online services for file sharing allow application files to be accessed in a distributed manner. In such a case, when a user shares an application file with a cloud-storage provider, a user accessing that document may end up accessing an encrypted file within no means to decrypt it and attempting to view the file using an application that does not understand the encrypted content. More generally, using encryption tools often creates friction in business processes within an enterprise, as once a user (or proxy acting on behalf of a user) encrypts data, it is no longer usable by the software that created and/or maintains that data. This produces unfriendly results for users who try to access the file later, either forgetting to decrypt it first or not having the software on hand to decrypt it. Furthermore, even if the end user understands encryption concepts and that a given application file has been encrypted, the end user might not be aware of what software to download or what steps are required to get a file into an unencrypted state. This can occur, e.g., when a user uploads a file transparently encrypted by a proxy agent to a shared cloud storage provider.

SUMMARY

Embodiments presented herein include a method for encrypting a first application data file. This method may generally include determining a file format of the first application data file and encrypting the first application data file. This method may also include storing the encrypted first application file as encrypted content in a second application data file. The second application data file has a file format matching the determined file format of the first application data file.

In a particular embodiment, this method may further include embedding, in the second application data file, instructions for accessing the encrypted content. The instructions may be generated based on the determined file format of the first application file, a user accessing the first application data file, an intended recipient of the first application data file, or a storage location of the encrypted file.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
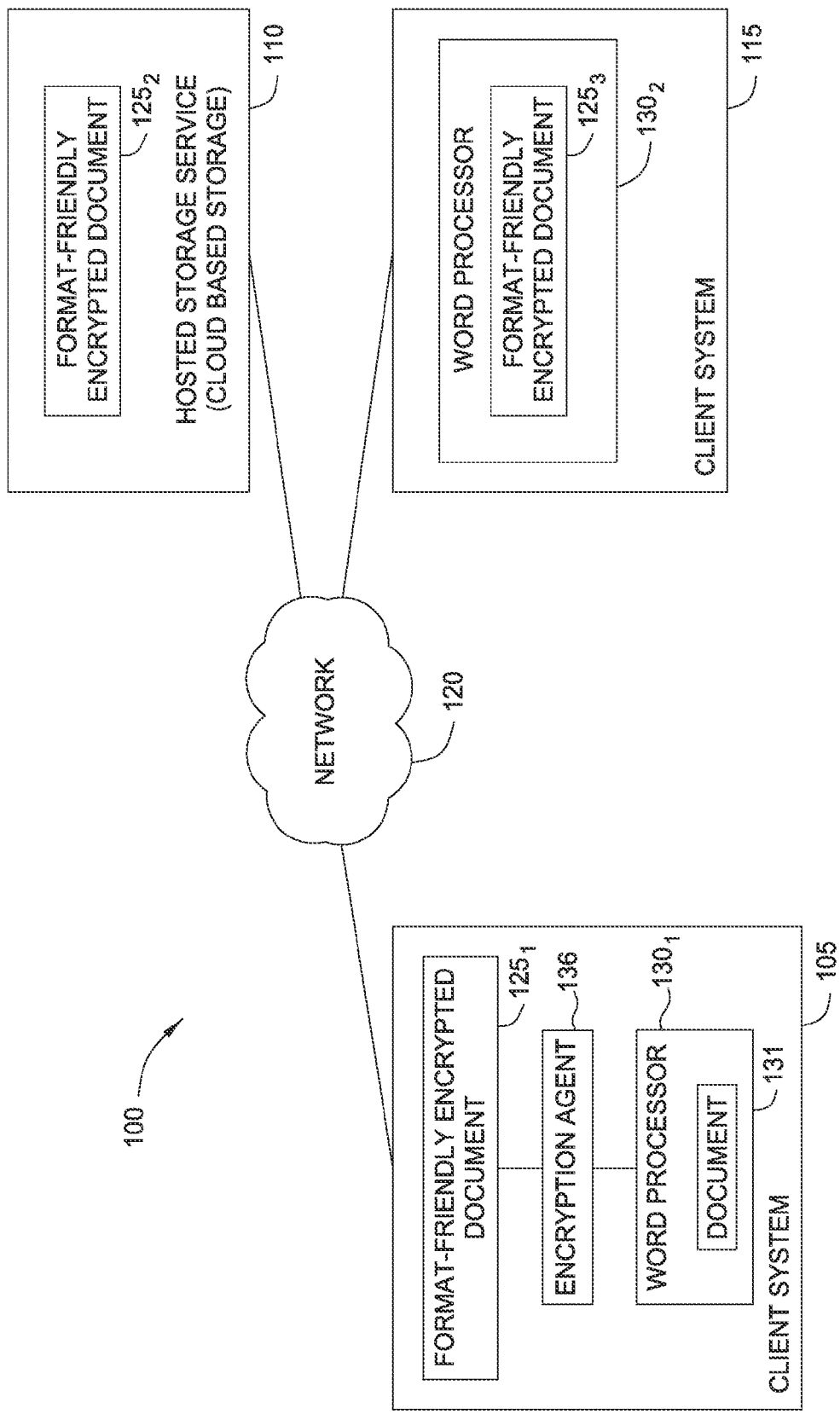
FIG. 1 illustrates an example computing environment for sharing application files encrypted using a format-friendly encryption format, according to one embodiment.

Embodiments presented herein provide techniques for encrypting documents using a format-friendly encryption process. For example, when a software agent (or a user interacting with an encryption tool) encrypts a target file, an encryption engine may encrypt the application file using a variety of algorithms. However, rather than simply output ciphertext or an encryption file in a proprietary binary format, the encryption engine may create an application file in the same format as the target file. For example, when a user encrypts a word processing document, the encryption engine outputs a word processing document which includes the ciphertext of the target file, e.g., embedded in an image of the document. Similarly, when a user encrypts a spreadsheet formatted in a particular application file format, the encryption engine outputs a spreadsheet which includes the ciphertext of the target file in the same spreadsheet application file format as the unencrypted document. This same approach can be used to provide format-friendly encryption files formatted in a variety of application formats, including, e.g., Microsoft Word® word-processing files (and other Microsoft Office® application files); Adobe® PDF files; open document format (ODF) files; HTML files; image files, e.g., .jpg or .png images; and virtually any other application file format.

In one embodiment, the encryption engine may include an image manipulation component and a file format manipulation component. The encryption engine may employ a variety of available cryptographic libraries and encrypt an application file using available encrypted file formats. For example, in one embodiment, the encrypted file format may be the PGP NetShare® file format developed by Symantec, Inc. In one embodiment, the encryption engine may store the encrypted file in an image file (e.g., a portable network graphics (.png) file) and place the resulting image file into a template. The template can contain instructions for how to go about decrypting the encrypted application file stored by the image container. The template is selected to match the format of the unencrypted application file.

Placing the encrypted file in an image file greatly reduces the chances that a given application will modify the encrypted file in any way (and thereby corrupt it for purposes of decryption). That is, most client applications do not modify the content of an image container within an application file, e.g., a word processing application does not typically modify an image embedded in a document. Instead, the application treats this image container as a binary blob, processed by other tools. Further, the template document may include general instructions for accessing the encrypted content. For example, the instructions may indicate what tools are needed to decrypt the contents as well as where to obtain such tools. Similarly, the instructions may be tailored in some cases based on the circumstances under which the document was encrypted. For example, assume a software agent encrypts the file to a key associated with a specific user (or group of users) in an enterprise. In such a case, the instructions in the template may be customized to reference the users (or group) that should be contacted in order to obtain access to the document.

Advantageously, creating an encrypted document using format-friendly encryption formats allows users to receive the information related to an encrypted document using the same application used to access the unencrypted contents. Accordingly, when a recipient who does not have the encryption/decryption software (or lacks the requisite keys needed to decrypt it) accesses the encrypted file, that recipient receives instructions about how to go about decrypting the file or receives information regarding what steps need to be taken or who they should contact to access the encrypted content. For example, instructions could indicate that the recipient needs to upload the format-friendly encrypted data file to another server, download software to interpret it, or otherwise include instructions appropriate for the circumstances of a particular case.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based storage service may be configured to host application files encrypted using a format-friendly encryption approach, as described in detail below. Similarly, a cloud based service could be configured to encrypt documents uploaded by users in an application format-friendly manner. Note, while described using a word processing document (or just "document") as a reference example of an application file that may be encrypted in an application format-friendly encryption format, one of ordinary skill in the art will recognize that embodiments of the invention may be adapted for use with a broad variety of application formats and client application software.

FIG. 1 illustrates an example computing environment 100 for sharing application files encrypted using a format-friendly encryption format, according to one embodiment. As shown, a client system 105 (e.g., a desktop computer, laptop computer, tablet or smartphone device etc.,) is executing a word-processor application $130_1$, allowing a user to create, edit, and store a document 131. The word processor $130_1$ is generally configured to save (and read) documents using a number of formats, e.g., the Microsoft Office Word® format (.doc or .docx files) or the Open Document Format (.odf files), rich text format (.rtf files), or simple text formats (.txt files). When the user finishes editing document $130_1$ it can be saved to local (or network) storage.

In one embodiment, however, the encryption agent 136 may be configured to transparently encrypt document 131 when stored by a user and transparently decrypt document $125_1$ when word processor $130_1$ requests access to this application file. Further, the encryption agent 136 may be configured to both encrypt document 131 and store it using a format-friendly encryption format, i.e., the same format as document 131 created by word processor $130_1$. Thus, format-friendly encrypted document $125_1$ stores a Microsoft Word® document encrypted by encryption agent 136 in a .doc or .docx file and stores an Adobe® PDF file in a .pdf document format, etc.

As shown, client system 105, 115 and hosted storage service 110 are each connected to a network 120 (e.g., the internet). In this example, assume the user uploads the format-friendly encrypted document $125_1$ to the hosted storage service 110 (e.g., the Dropbox® file sharing service or other public or enterprise-private hosting service), This is shown in FIG. 1 as format-friendly encrypted document $125_2$. Further, assume the user sends a link to the format-friendly encrypted document $125_2$ to a user of client system 115 (or is the same user simply assessing format-friendly encrypted document $125_2$ from a client system 115). As shown, client system 115 is not configured with the encryption agent 136 (or any requisite keys) needed to decrypt and view document 131.

When the user downloads format-friendly encrypted document $125_2$ from hosted storage service 110, a copy (format-friendly encrypted document $125_3$) is stored on client system 115. Further, when accessed using word processor $130_2$, the format-friendly encrypted document $125_3$ presents instructions for accessing, or at least information related to, the encrypted content of the document 131. For example, the instructions could provide links to the software needed to decrypt format-friendly encrypted document $125_3$, i.e., encryption agent 136, as well as instructions for obtaining the appropriate keys needed to access the encrypted content of format-friendly encrypted document $125_3$, i.e., the contents of document 131, or links to the appropriate personnel of an enterprise to contact in order to obtain access to document 131. This approach allows the client application (e.g., word processor $130_2$) used to create, edit, or view a document of a given type to view the format-friendly encrypted document $125_3$ without receiving an error or presenting a user with gibberish.

Figure 2:
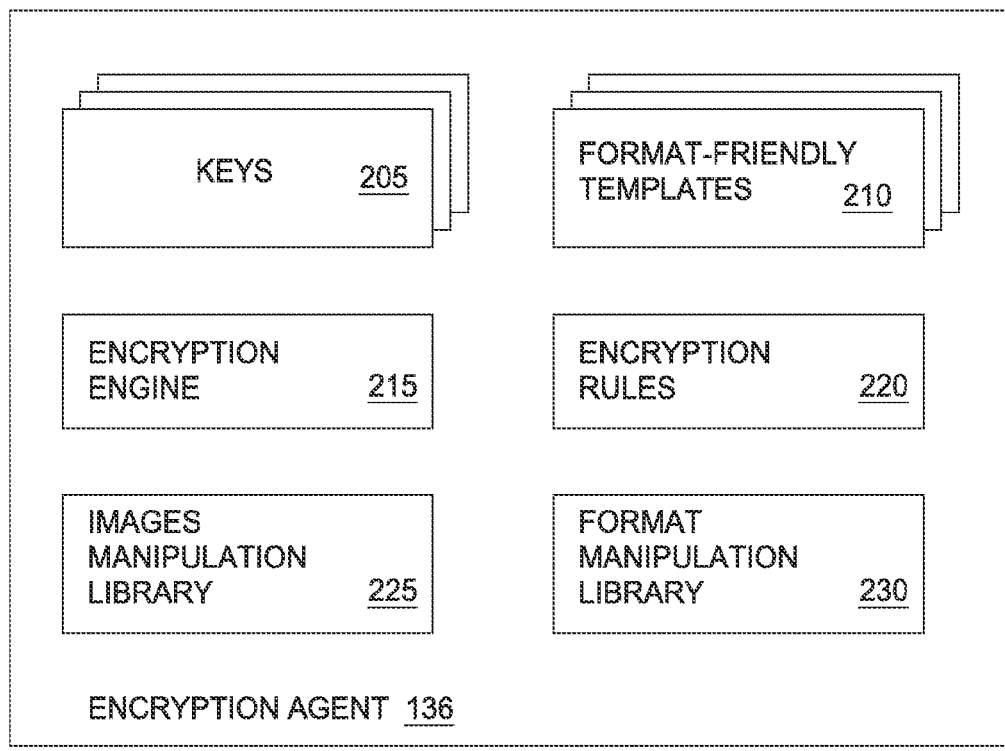
FIG. 2 illustrates an encryption agent configured to encrypt application files using format-friendly encryption formats, according to one embodiment.

FIG. 2 illustrates an encryption agent 136 configured to encrypt application files using format-friendly encryption formats, according to one embodiment. As shown, the encryption agent 136 includes keys 205, format-friendly templates 210, encryption engine 215, encryption rules 220, image manipulation library 225, and format manipulation library 230. In one embodiment, the components of encryption agent 136 provide software configured to manage the encryption and decryption of application files using format-friendly encryption formats.

In general, the encryption engine 215 may be configured to perform any suitable encryption/decryption algorithms using keys 205 to encrypt/decrypt an application data file (e.g., a word-processor document). In one embodiment, the encryption engine 215 may be configured to encrypt such application files based on rules 220. For example, a user (or enterprise system administrator) may configure some (or all) documents created by a particular user, saved to a particular location, having certain content, or having other identifiable characteristics to be encrypted when stored by a client application or when published to a particular storage location (e.g., when published to the hosted application service 110).

The encryption engine 215 generally creates an encrypted file according to a given file format, e.g., the PGP NetShare encryption format, or more generally, generates ciphertext. However, rather than store the encrypted application file in this file format, the encryption engine 215 may embed the encrypted file in one of the format-friendly templates 210. The particular template 210 may be selected to have the same file format as the underlying application file encrypted by the engine 215. Again, e.g., if the underlying client application file is a document created using a particular word processing file format, then the template 210 is selected to match that format.

In one embodiment, the image manipulation library 225 is used to format the encrypted file format as image data, e.g., as a .png or .jpg image. As known, these (and other) image formats typically provide a container format that can store image data, but can be used to store any arbitrary data. Further, such containers may be embedded in a broad variety of other application files (themselves containers). Doing so helps protect the encrypted data from being tampered with by an application program that is accessing a format-friendly encrypted file.

Once the encrypted application file is stored in an image file, the format manipulation library 230 may embed it in the appropriate format-friendly template 210. For example, in one embodiment, each format-friendly template 210 may include instructions for accessing an encrypted document, as well as include a placeholder or otherwise replaceable image container. The format manipulation library 230 may remove the temporary image container from the template 210 and replace it with the image container file storing the encrypted data encrypted by engine 215 and stored in an image file by image manipulation library 225.

Figure 3:
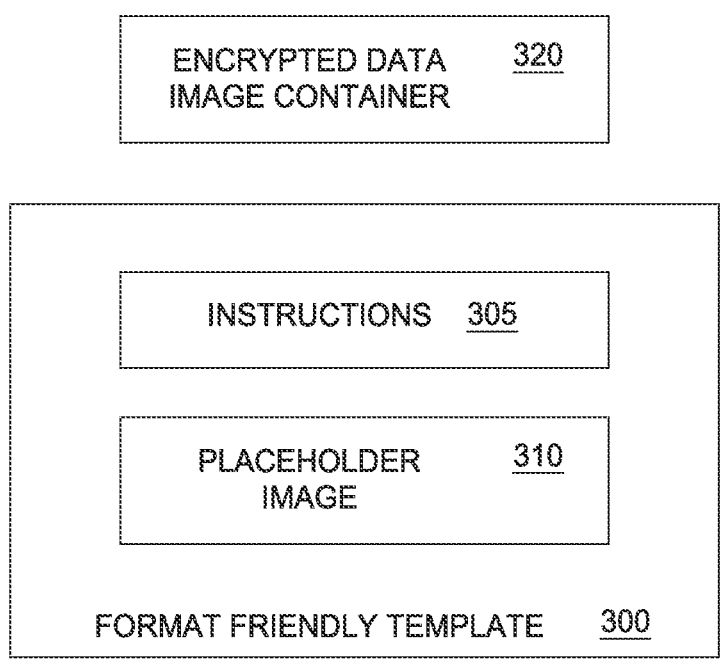
FIG. 3 illustrates a template for a format-friendly encrypted application file, according to one embodiment.

For example, FIG. 3 illustrates a template 300 for a format-friendly encrypted application file, according to one embodiment. As shown, the format-friendly template 300 includes instructions 305 and an placeholder image 310. As noted, the instructions 305 may provide a user with information needed to access encrypted data stored in a populated instance of the template 300. Instructions 305 may be generic for a given template, but may also include scripts, code, or other logic executed to customize the instructions based on the application format, the content of the application file, the user creating/editing/accessing the file, the intended recipient of the encrypted file, the storage location of the encrypted file, or a hosted service (e.g., the Dropbox® service) where the encrypted file may be published and accessed, etc.

In one embodiment, the placeholder image 310 is part of the template 300. It may be placed anywhere within the template 300 that fits naturally with the flow of the template instructions 305. In one embodiment, a new image file, i.e, an encrypted data image container 320, is created as part of the process of evaluating the encryption rules 220 by the encryption engine 215 working in concert with the image manipulation library 225 in the encryption agent 136. In one embodiment, the encrypted data image container 320 is a .PNG file with the enciphered data from the target application document stored as a binary non-interpretable segment within a larger PNG image. In another embodiment, the enciphered data is transformed via the base 64 encoding process into ASCII text and stored within the .PNG file as a text segment. The resulting .PNG file displays just as it did before the insertion of the enciphered data; only its file size has changed. The resulting encrypted data image container 320 then replaces the placeholder image 310 in a populated instance of the template document 300.

Figure 4:
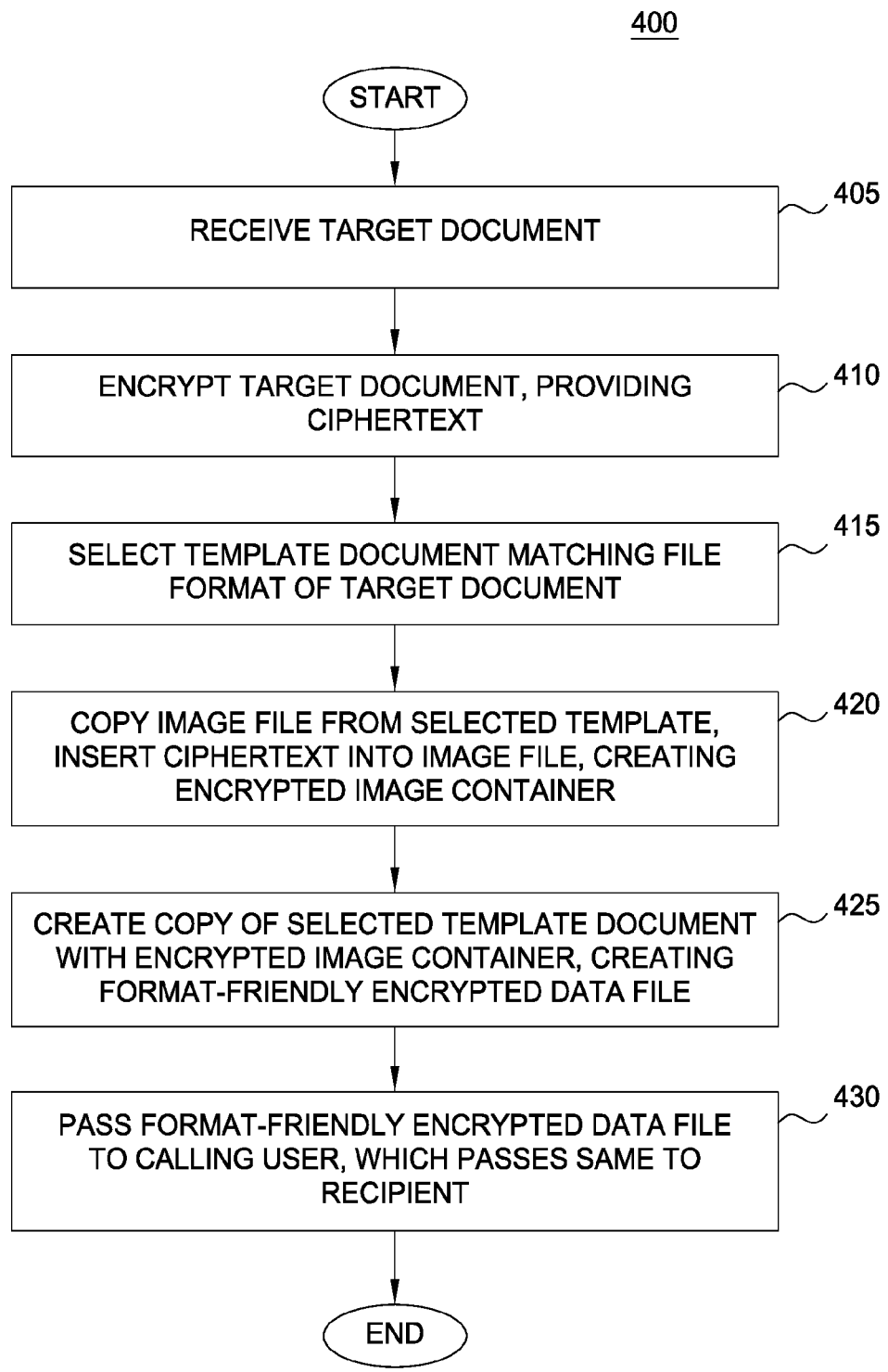
FIG. 4 illustrates a method for encrypting a target application file using a format-friendly encryption format, according to one embodiment.

FIG. 4 illustrates a method 400 for encrypting a target application file using a format-friendly encryption format, according to one embodiment. As shown, the method 400 begins at step 405, where an encryption agent receives (or identifies) a target application file to encrypt. As noted, e.g., the encryption agent may provide a plug-in or driver used transparently encrypt and decrypt files created, edited, or otherwise accessed by a client application or transparently encrypt and decrypt files published to a shared storage repository.

At step 410, the encryption agent encrypts the target document, providing a ciphertext file. At step 415, the agent selects a template document. In particular, the agent selects a template having a file format that matches the target document received at step 405 (e.g., a template having a .doc or .docx file format for a word processing file recited at step 405). At step 420, the encryption agent creates a copy of the image file, the ciphertext created at step 410 is placed into that copy, and the copy replaces the placeholder image in the selected template. At step 425, the agent creates a copy of the selected template document with the encrypted image container. For example, the encrypted agent may create the instructions for accessing the document stored in the format-friendly encrypted file created from the selected template.

Once created, at step 430 the encryption agent passes the encrypted format-friendly data file to a calling user or application, which passes same to a recipient. In a simple case, the encrypted format-friendly data file is saved to a local storage disk. For example, the encryption agent may be configured as a plug-in for a word-processing application, where documents are encrypted and decrypted whenever accessed by a user. In such a case, the encrypted format-friendly data file both encrypts the contents of the word-processor file and saves it in the format of that word processing application.

Thus, when shared with other users (as a data file of that application) users that cannot decrypt the file are presented with a meaningful indication of the document state, as well as useful information for obtaining (or requesting) access to the encrypted content. In other cases, the encryption agent may be part of a publishing tool used to upload documents to a cloud based hosting service. In such a case, the encryption agent could encrypt all documents that exit an enterprise boundary before being uploaded to a public hosting service (e.g., the Dropbox® service).

Note, the process for decrypting a format-friendly encrypted data file is relatively straightforward. When a user requests access to the encrypted format-friendly data file (e.g., opens a word processing file) the encryption agent can access the encrypted file data from the image container and decrypt it. Once decrypted, the original application data file is passed to the requesting application (e.g., the original word processing document is passed to the word processor). In cases where the client application does not have the encryption agent (or the keys needed to access a format-friendly encrypted data file), the client application accesses the format-friendly encrypted data file based on the format of the format-friendly encrypted data. Again using a word-processor as an example, the format-friendly encrypted data would provide a word-processor document, where the first page of the document presents instructions for accessing the encrypted content, and the encrypted data file itself is not shown as part of the document contents. Instead, the encrypted data file is stored in the image container and configured to not be displayed as part of the contents of the word processing document.

Figure 5:
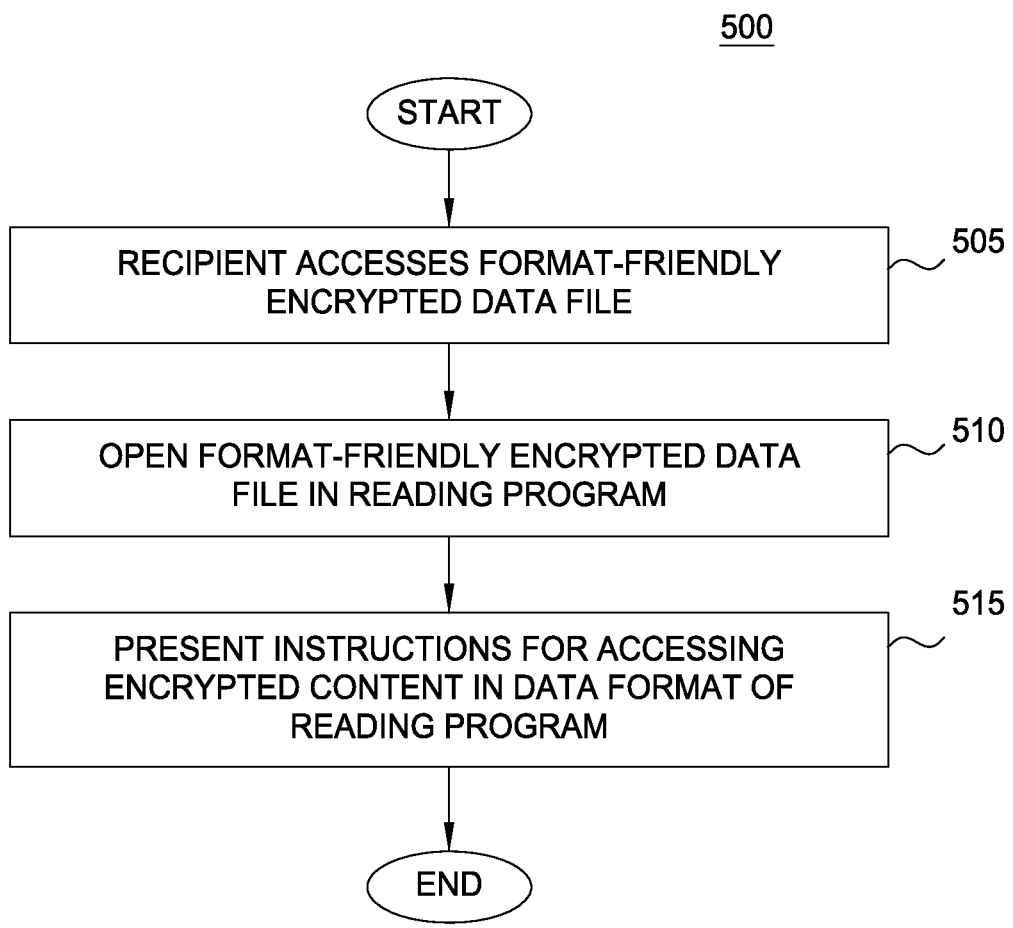
FIG. 5 illustrates a method for accessing an application file encrypted using a format-friendly encryption format, according to one embodiment.

For example, FIG. 5 illustrates a method 500 for accessing an application file encrypted using a format-friendly encryption format, according to one embodiment. As shown, the method 500 begins at step 505, where a user requests to access a format-friendly encrypted data file using a client application that can read the contents of the format-friendly encrypted data file. For example, a recipient may have received a link to a word-processing document published to a cloud based file hosting service. In such a case, the recipient may try to access the format-friendly encrypted data file using the appropriate word processing application, viewer or file reader. At step 510, the client application opens the format-friendly encrypted data file, and at step 515 presents instructions for accessing the encrypted content. The instructions are presented in the data format of the reading program (e.g., as text in a word processing file).

Figure 6:
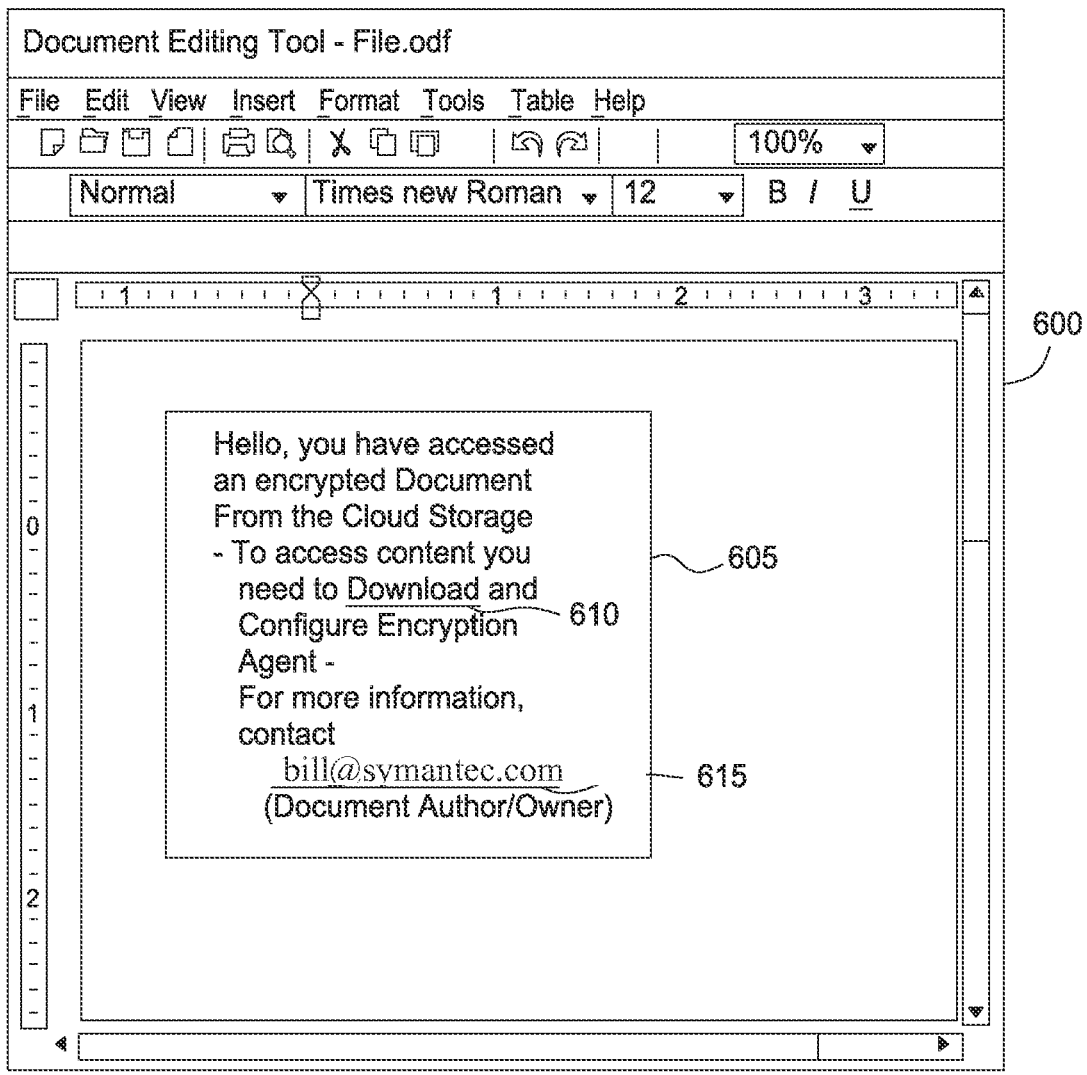
FIG. 6 illustrates an example of an application accessing a file encrypted using a format-friendly encryption format, according to one embodiment.

FIG. 6 illustrates an example of an application accessing a file encrypted using a format-friendly encryption format, according to one embodiment. As shown, a word processing application 600 displays the contents of a format-friendly encrypted data file. In this particular example, the first page of a word-processing document shows instructions 605 for accessing the encrypted content. Link 610 provides a network address to download encryption software and email address 615 provides an email address for contacting an enterprise administrator. Of course, the particular instructions (or other information provided by the format-friendly encrypted data file) may be tailored to suit the needs of a particular case.

Figure 7:
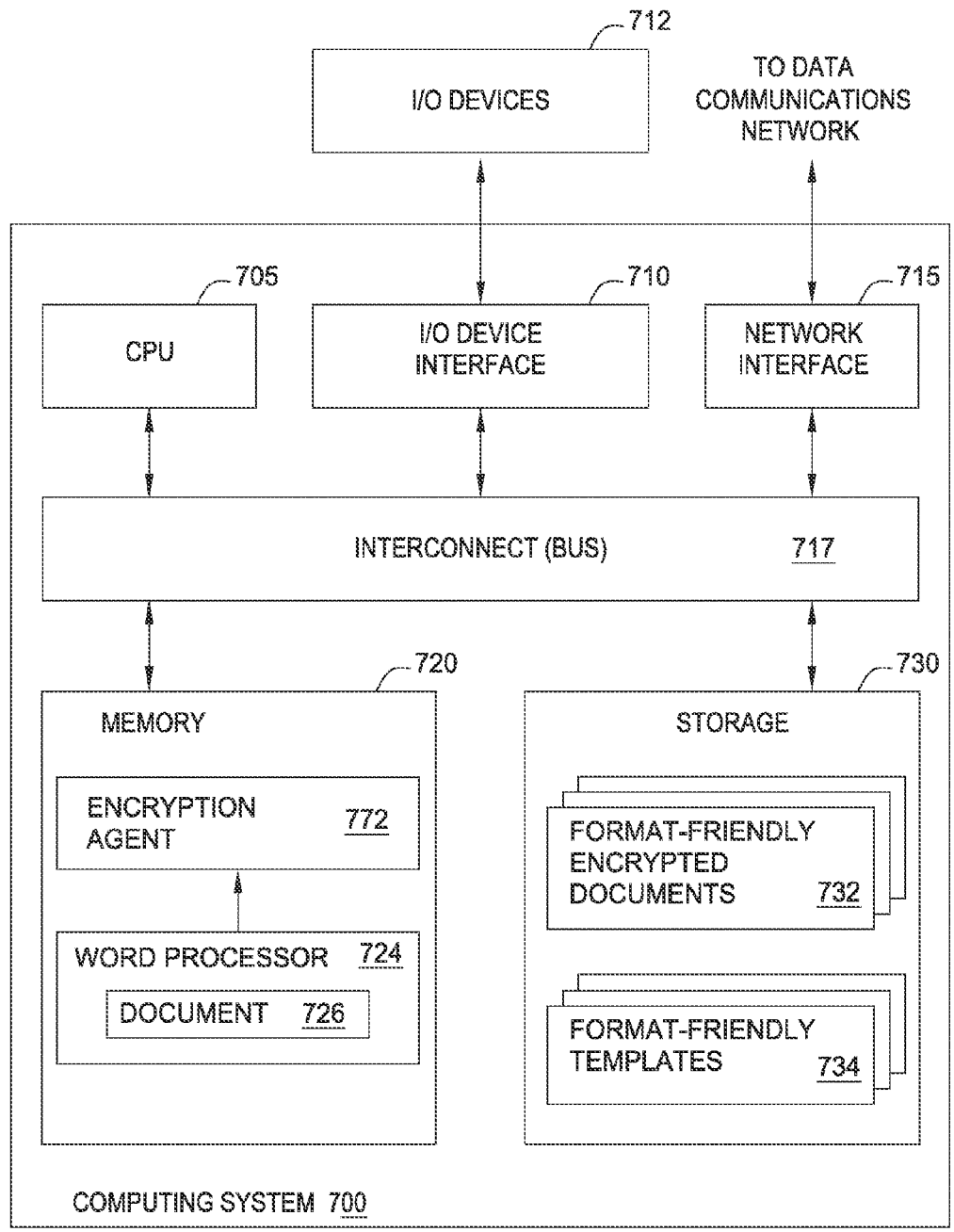
FIG. 7 illustrates an example computing system configured with an application used to encrypt application files using a format-friendly encryption format, according to one embodiment.

FIG. 7 illustrates a computing system 700 configured with an application used to encrypt application files using a format-friendly encryption format, according to one embodiment. As shown, the computing system 700 includes, without limitation, a central processing unit (CPU) 705, a network interface 715, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, or optical storage, network attached storage (NAS), or a storage area-network (SAN).

Illustratively, the memory 720 includes an encryption agent 722 and a word processor application 724, and the word processor application 724 is shown accessing a document 726. Storage 730 includes format-friendly encrypted files 732 and format-friendly templates 734. The word processing application 724 is used to create and edit document 726 in a given format (e.g., a .doc, .docx, .pdf, .odf, .rtf, .txt files, to name a few common examples). When such a document file is saved, the encryption agent 722 creates a format-friendly encrypted document 732 corresponding to the original format of the document 726. As described, the encryption agent 722 may access a variety of format-friendly templates 734 corresponding to the file formats accessed by word processor 724 (or file formats used by a variety of other client applications). Further, once a given format-friendly encrypted file 732 is created by the encryption agent and saved in storage 730, it may be shared or published as any other file of the given application type (e.g., a word processing file in a particular format). When users that do not have the encryption agent 722 attempt to access the given format-friendly encrypted file 732, the application open the file and present instructions (or at least information) related to the actual encrypted content stored in the format-friendly encrypted documents 732. For example, a user may send a document outside of an enterprise boundary (e.g., emailing a document to work on from home) or publish a document to a cloud based storage service (e.g., the Dropbox® service).

Advantageously, embodiments presented herein provide techniques for encrypting application data files using a format-friendly encryption process. A software agent may create an encrypted version of an application file formatted using the same data file format of the unencrypted file. For example, when a user encrypts a word processing document, the software agent outputs a word processing document which includes the ciphertext of the target file, e.g., embedded in an image container of the document. Further, format-friendly encrypted documents generated by the software agent may include instructions for accessing the encrypted content, allowing the standard applications for accessing a given file format to present the instructions to a user. Creating an encrypted document using a format-friendly encryption format (i.e., using the same format as the unencrypted application file), allows users who access an encrypted file hosted by a cloud storage provider to receive the information needed to access that application file using the customary application used to access the unencrypted application file.

While the foregoing is directed to embodiments of the present invention, other and further embodiments of the invention may be devised without departing from the basic scope thereof, and the scope thereof is determined by the claims that follow.

What is claimed is:

1. A method for encrypting a first application data file, the method comprising:
   determining, by operation of a processor, a file format of the first application data file;
   encrypting the first application data file;
   selecting a second application data file template having a file format matching the file format of the first application data file, wherein a placeholder image is embedded in the second application data file template;
   storing the first application data file as encrypted content in an image file container, wherein storing the first application data file as the encrypted content in the image file container comprises:
      generating the image file container having a first image format, and
      embedding the encrypted content, as image data, in the image file container;
   replacing the placeholder image in the second application data file template with the image file container storing the first application data file as encrypted content;
   embedding, in the second application data file template, textual instructions for accessing the encrypted content; and
   generating a second application data file from the second application data file template, wherein the textual instructions are presented to users when accessing the second application data file.

2. The method of claim 1, wherein the instructions are generated based on at least one of: (i) the file format of the first application data file, (ii) a user accessing the first application data file, (iii) an intended recipient of the first application data file, and (iv) a storage location of the first application data file.

3. The method of claim 1, wherein the instructions include a link to a software application required to decrypt the encrypted content stored in the second application data file.

4. The method of claim 1, wherein the first image format comprises the Portable Network Graphics (PNG) format.

5. The method of claim 1, wherein the first application data file is encrypted and stored in response to determining that the first application data file is to be published to a hosted storage service.

6. The method of claim 1, wherein the second application data file template is selected from a plurality of application data file templates, each having a different application data file format.

7. The method of claim 1, wherein the file format of the first application data file comprises one of a word processor format, a spreadsheet format, presentation slide format, and a portable document format (PDF).

8. A non-transitory computer-readable storage medium storing instructions, which, when executed on a processor, performs an operation for encrypting a first application data file, the operation comprising:
   determining a file format of the first application data file;
   encrypting the first application data file;
   selecting a second application data file template having a file format matching the file format of the first application data file, wherein a placeholder image is embedded in the second application data file template;

storing the first application data file as encrypted content in an image file container, wherein storing the first application data file as the encrypted content in the image file container comprises:
   generating the image file container having a first image format, and
   embedding the encrypted content, as image data, in the image file container;
replacing the placeholder image in the second application data file template with the image file container storing the first application data file as encrypted content;
embedding, in the second application data file template, textual instructions for accessing the encrypted content; and
generating a second application data file from the second application data file template, wherein the textual instructions are presented to users when accessing the second application data file.

9. The computer-readable storage medium of claim 8, wherein the instructions are generated based on at least one of: (i) the file format of the first application data file, (ii) a user accessing the first application data file, (iii) an intended recipient of the first application data file, and (iv) a storage location of the first application data file.

10. The computer-readable storage medium of claim 8, wherein the instructions include a link to a software application required to decrypt the encrypted content stored in the second application data file.

11. The computer-readable storage medium of claim 8, wherein the first image format comprises the Portable Network Graphics (PNG) format.

12. The computer-readable storage medium of claim 8, wherein the first application data file is encrypted and stored in response to determining that the first application data file is to be published to a hosted storage service.

13. The computer-readable storage medium of claim 8, wherein the second application data file template is selected from a plurality of application data file templates, each having a different application data file format.

14. The computer-readable storage medium of claim 8, wherein the file format of the first application data file comprises one of a word processor format, a spreadsheet format, presentation slide format, and a portable document format (PDF).

15. A system, comprising:
   a processor; and
   a memory hosting an application, which, when executed on the processor, performs an operation for encrypting a first application data file, the operation comprising:
      determining a file format of the first application data file,
      encrypting the first application data file,
      selecting a second application data file template having a file format matching the file format of the first application data file, wherein a placeholder image is embedded in the second application data file template,
      storing the first application data file as encrypted content in an image file container, wherein storing the first application data file as the encrypted content in the image file container comprises:
         generating the image file container having a first image format; and
         embedding the encrypted content, as image data, in the image file container;
      replacing the placeholder image in the second application data file template with the image file container storing the first application data file as encrypted content,
      embedding, in the second application data file template, textual instructions for accessing the encrypted content, and
      generating a second application data file from the second application data file template, wherein the textual instructions are presented to users when accessing the second application data file.

16. The system of claim 15, wherein the instructions are generated based on at least one of: (i) the file format of the first application data file, (ii) a user accessing the first application data file, (iii) an intended recipient of the first application data file, (iv) and a storage location of the first application data file.

17. The system of claim 15, wherein the instructions include a link to a software application required to decrypt the encrypted content stored in the second application data file.

18. The system of claim 15, wherein the first image format comprises the Portable Network Graphics (PNG) format.

19. The system of claim 15, wherein the first application data file is encrypted and stored in response to determining that the first application data file is to be published to a hosted storage service.

20. The system of claim 15, wherein the second application data file template is selected from a plurality of application data file templates, each having a different application data file format.

21. The system of claim 15, wherein the file format of the first application data file comprises one of a word processor format, a spreadsheet format, presentation slide format, and a portable document format (PDF).

* * * * *